2,848,472

PREPARATION OF ALKYL ALUMINUM DIHALIDES

Delmer L. Cottle, Highland Park, N. J., assignor to Esso Research and Engineering Company, a corporation of Delaware No Drawing. Application August 12, 1955
Serial No. 528,115

13 Claims. (Cl. 260—448)

This invention relates to a novel method for preparing alkyl aluminum dihalides and particularly to the preparation of methyl and ethyl aluminum dichlorides.

Alkyl aluminum dihalides have been prepared in the prior art by several different methods. However, these prior art methods of preparation have in general been complicated, involving the preparation and recovery of intermediate products, thus necessitating a series of reactions to obtain the final alkyl aluminum dihalide product. In certain of the prior art processes, reaction control was extremely difficult due to the vigorous reactions which took place. In some cases, complicated and time-consuming procedures, such as fractional distillation, were required.

A novel method has now been found for preparing alkyl aluminum dihalides which is considerably simpler than the prior art methods of preparation. Briefly, the present invention comprises reacting together (1) alkyl halide, (2) aluminum metal and (3) aluminum halide. This reaction is believed to proceed in accordance with the following chemical equation:

$$3RX + 2Al + AlX_3 \rightarrow 3RAlX_2$$

where R represents an alkyl group and X represents a halogen atom. The present method of preparation thus involves a single chemical reaction. Upon completion of the reaction, the alkyl aluminum dihalide product may be recovered from the reaction mixture (which may contain a small amount of unreacted aluminum metal and aluminum halide) by distillation or by dissolving the alkyl aluminum dihalide in a suitable organic solvent, e. g., n-heptane, and separating the resultant solution (by filtration or decantation, etc.) from the remainder of the reaction mixture.

The alkyl aluminum dihalides prepared in accordance with the present invention have the following formula:

$$RAlX_2$$

where R is an alkyl group and X is a halogen atom. The present method is particularly effective for preparing methyl and ethyl aluminum dihalides, particularly the chlorides, bromides and iodides. The alkyl aluminum dihalides prepared in accordance with this invention are particularly useful as catalysts for chemical reactions.

The present method for preparing mono-alkyl aluminum dihalides is carried out in general employing approximately stoichiometric portions of the reactants. More specifically, the present method comprises reacting about 3 moles of alkyl monohalide with about 2 atoms of aluminum metal and about 1 mole of aluminum tri-halide. These reactants may be reacted together simultaneously in these proportions. However, if desired the aluminum halide may be added to a mixture of the aluminum metal and alkyl halide in incremental amounts during the reaction. It appears that this procedure increases the overall reaction rate and favors the desired reaction. If desired, an excess of the alkyl halide, e. g., 5 to 20 mole percent, may be employed to drive the reaction to completion to thereby minimize the amount of unreacted aluminum metal and aluminum halide. The present reaction may be carried out generally at a temperature in the range of about 20° to 200° C., preferably at a temperature of about 20° to 125° C. In carrying out this reaction, it is preferred to initiate the reaction at a temperature below about 100° C. When preparing methyl aluminum halides, it is particularly preferred to maintain the initial reaction temperature below about 80° C., and in the case of ethyl aluminum halides, it is particularly preferred to maintain the initial reaction temperature below about 60° to 80° C. These relatively low reaction temperatures are maintained until the reaction is initiated, which usually occurs after about 0.1 to 1.0 hour. Thereafter the reaction temperature may be raised within the temperature range described above. Generally the reaction will be complete after about 4 to 24 hours, usually after about 8 to 16 hours.

The reaction may be conveniently carried out at atmospheric pressure although it will be understood that elevated pressures up to 15 atmospheres or higher may be employed if desired. Methyl and ethyl chlorides are gases at room temperature and atmospheric pressure so that the reaction will be carried out generally by contacting these as gases with the aluminum metal and aluminum halide. It is desirable to employ the aluminum metal in a finely divided form such as an aluminum powder and to stir the reaction mixture to assure efficient contacting of the reactants. The reaction is exothermic and therefore ice baths or other cooling means may be employed to maintain the temperature of reaction at the desired level. The alkyl aluminum dihalide products are generally solids at room temperature and it is preferred, therefore, to increase the reaction temperature during the reaction to maintain the bulk of the alkyl aluminum dihalide product as a liquid to promote an efficient reaction. The present reaction may be carried out in the presence of inert liquid diluents or solvents. Inert hydrocarbon diluents are preferred, e. g. methyl cyclo pentane, benzene.

As stated above, the present method of preparing alkyl aluminum dihalides is particularly effective for preparing methyl and ethyl aluminum dihalides, particularly the chloride, iodide and bromide dihalides. The preparation of these derivatives is shown by the following chemical equations:

$$3RCl + 2Al + AlCl_3 \rightarrow 3RAlCl_2 \qquad (1)$$

$$3RI + 2Al + AlI_3 \rightarrow 3RAlI_2 \qquad (2)$$

$$3RBr + 2Al + AlBr_3 \rightarrow 3RAlBr_2 \qquad (3)$$

where R represents a methyl group or ethyl group. The preparation of the bromides (Equation 3 above), and particularly the iodides (Equation 2 above), proceeds readily, but in the case of the chlorides (Equation 1 above) it is preferred to employ a small amount of a reaction promoter to initiate and speed up the reaction between the reactants. More specifically, it is preferred in the preparation of the chlorides to employ a small amount of alkyl iodide or alkyl bromide as a reaction promoter. When preparing methyl aluminum dichloride, it is preferred to use a small amount of either methyl iodide or methyl bromide; when preparing ethyl aluminum dichloride, it is preferred to use a small amount of ethyl iodide or ethyl bromide. Generally about 0.05 to 3.0% by weight, preferably about 0.1 to 1.0% by weight, and more preferably about 0.2 to 0.6% by weight, based on the weight of total reactants, of the reaction promoter will be employed. Alkyl iodides are more effective reaction promoters than are the alkyl bromides. However, the alkyl bromides are less expensive and may, therefore, be preferred for this reason in certain instances. Other substances containing bromine or iodine may be used, including the elements themselves. The preparation of alkyl aluminum dihalides wherein the alkyl group contains 3 or more carbon atoms proceeds with considerable difficulty unless an additional reaction promoter such as an ether, preferably a dialkyl ether, e. g., diethyl ether, is employed in an amount of about 1 to 200%, preferably about 20 to 50%, by weight based on the reactants.

Upon completion of the reaction, there may be a small amount of unreacted aluminum metal and aluminum halide in the reaction mixture. Thus in order to obtain an essentially pure alkyl aluminum dihalide product, it is preferred to separate the alkyl aluminum dihalide product from the reaction mixture by distillation or by solution in a relatively inert hydrocarbon. If distillation is employed, it is preferably carried out under vacuum to avoid the thermal decomposition of the product. In general, it is preferred to employ pressures below about 150 mm. of Hg, preferably below about 100 mm., e. g., 0.1 to 50 mm. of Hg.

The invention will be more fully understood by reference to the following examples. It is pointed out, however, that the examples are given for the purpose of illustration only and are not to be construed as limiting the scope of the present invention in any way.

*Example I.—Preparation of methyl aluminum dichloride*

100 g. of aluminum metal fines and 247 g. of aluminum chloride were added to a 3-necked flask. One cc. of methyl iodide was added to the flask and then methyl chloride gas was introduced (the flask having been swept previously with nitrogen). The 3-necked flask served as a reactor and was equipped with a stirrer and two Dry Ice condensers, each equipped with a mercury seal. The reaction temperature was maintained in the range of about 61° to 123° C. The initial reaction temperature was maintained below about 80° C. until the reaction was initiated as indicated by the mercury seals which showed less than atmospheric pressure in the reactor.

Upon completion of the reaction, the methyl aluminum dichloride product was separated by distillation from the reaction mixture at a vapor temperature of 98° to 104° C. and 100 mm. of Hg pressure. The methyl aluminum dichloride product was then redistilled at 98° to 103° C. and 100 mm. of Hg pressure. It was found that approximately 95 weight percent of the products distilled at 99° to 100° C. Three hundred g. of the methyl aluminum dichloride product was obtained. In the distillation, it was necessary to heat the condenser because the methyl aluminum dichloride is a solid, melting at 73° C.

*Example II.—Preparation of ethyl aluminum dichloride*

100 g. of powdered aluminum metal and 247 g. of aluminum chloride were added to a 3-necked flask followed by the addition of 2 cc. of ethyl iodide. Ethyl chloride gas was then introduced to the flask in the same manner as described above in Example I at a flask temperature of below 60° C. until the reaction was initiated. The reaction temperature thereafter was maintained at about 30° to 82° C. throughout the reaction. About 10 hours were required for the reaction. The ethyl aluminum dichloride product was then separated from the reaction mixture by distillation at a vapor temperature of about 105° to 115° C. at a pressure of 50 mm. of mercury.

*Example III*

Ethyl aluminum dichloride was also prepared by adding 100 g. of aluminum powder and about 3 g. of aluminum chloride to the reactor followed by 3 cc. of ethyl bromide. On addition of ethyl chloride, the reaction initiated at about 80° C. and was continued until the powdered aluminum appeared damp. This took about 3 hours at a reactor temperature of about 40–50° C. One hundred g. of aluminum chloride was added and reaction with ethyl chloride continued for 2 more hours. At this point the remainder of the aluminum chloride, 147 g., was added and the addition of ethyl chloride continued for about 4 hours at 40° C. The produce distilled at 36 to 46.5° C. at 0.2 mm. of mercury pressure.

*Example IV*

This example was similar to Example III except that the reaction initiated at a reactor temperature of 40° C. and was continued at 35 to 82° C. for approximately 12 hours. The product was slurried with n-heptane which had been dried over sodium metal. After separation by filtration from unchanged aluminum and aluminum chloride, 1360 cc. of solution was obtained which analyzed as containing 511 g. of ethyl aluminum dichloride.

What is claimed is:

1. A method for preparing alkyl aluminum dihalides which comprises reacting together (1) about 3 moles of alkyl halide selected from the group consisting of methyl halides and ethyl halides, (2) about 2 atoms of aluminum metal and (3) about 1 mole of aluminum halide, said halide being selected from the group consisting of chlorides, bromides and iodides, said reaction being carried out at a temperature in the range of about 20° to 125° C. for about 4 to 24 hours, and recovering alkyl aluminum dihalide as a product from the resultant reaction mixture.

2. Method according to claim 1 wherein said reaction is carried out by maintaining the initial temperature of reaction below about 100° C. until the reaction is initiated.

3. Method according to claim 1 wherein said halide is chloride.

4. Method according to claim 3 wherein a small amount of alkyl bromide is employed as a reaction promoter.

5. Method according to claim 3 wherein a small amount of alkyl iodide is employed as a reaction promoter.

6. Method according to claim 1 wherein said product is recovered by distillation carried out at a pressure below about 150 mm. of Hg.

7. Method according to claim 1 wherein said product is recovered by dissolving it in an inert liquid organic solvent.

8. A method for preparing methyl aluminum dichloride which comprises reacting together (1) about 3 moles of methyl chloride, (2) about 2 moles of finely divided aluminum metal and (3) about 1 mole of aluminum chloride in the presence of a small amount of a reaction promoter, said reaction being carried out at a temperature in the range of about 20° to 200° C. for about 4 to 24 hours, the initial temperature of reaction being maintained below about 80° C. until the reaction is initiated, said reaction promoter being selected from the group consisting of methyl bromide and methyl iodide and being employed in an amount of about 0.05 to 3.0% by weight based on the total reactants, and then recovering methyl aluminum dichloride from the reaction mixture by distillation at a pressure below about 150 mm. of Hg.

9. A method for preparing ethyl aluminum dichloride which comprises reacting together (1) about 3 moles of ethyl chloride, (2) about 2 moles of finely divided aluminum metal and (3) about 1 mole of aluminum chloride in the presence of a small amount of a reaction promoter, said reaction being carried out at a temperature in the range of about 20° to 200° C. for about 4 to 24 hours, the initial temperature of reaction being maintained below about 60° C. until the reaction is initiated, said reaction promoter being selected from the group consisting of ethyl bromide and ethyl iodide and being employed in an amount of about 0.05 to 3.0% by weight based on the total reactants, and then recovering ethyl aluminum dichloride from the reaction mixture by distillation at a pressure below about 100 mm. of Hg.

10. A method for preparing lower alkyl aluminum dichlorides which comprises mixing aluminum powder with aluminum chloride and contacting the resulting mixture with a gaseous lower alkyl chloride at about 20 to 125° C.

11. A method for preparing methyl aluminum dichloride which comprises mixing about 2 atomic parts by weight of aluminum powder with 1 molar part by weight of $AlCl_3$ and reacting the resulting mixture with gaseous methyl chloride, with stirring, using an initial reaction temperature below 80° C., and an overall reaction temperature range within the limits of 20 to 125° C.

12. A method for preparing ethyl aluminum dichloride which comprises mixing together 2 atomic parts by weight of aluminum powder with 1 molar part by weight of $AlCl_3$, and reacting the resulting mixture with ethyl chloride gas at an initial reaction temperature below 60° C. until the reaction is initiated, and thereafter maintaining the reaction temperature within the approximate limits of about 30 to 82° C.

13. A method of preparing ethyl aluminum dichloride which comprises reacting aluminum powder with ethyl chloride in the presence of a small proportion of aluminum chloride, at an initial reaction temperature of about 40 to 80° C., then adding a substantially larger proportion of aluminum chloride, with continuing addition of ethyl chloride, and finally adding an additional substantial amount of aluminum chloride and continuing addition of ethyl chloride until the reaction of said three reactants to form ethyl aluminum dichloride has been substantially completed, the temperature of the reaction mixture, subsequent to initiation of the reaction, being maintained at about 40 to 50° C.

References Cited in the file of this patent

UNITED STATES PATENTS 2,270,292   Grosse _____ Jan. 20, 1942